US012803484B2

(12) United States Patent
Samadaei et al.

(10) Patent No.: US 12,803,484 B2
(45) Date of Patent: Nov. 17, 2026

(54) ELECTRIC MOTOR DRIVE SYSTEM AND TRANSIENT CURRENT PROTECTION

(71) Applicant: Volvo Truck Corporation, Gothenburg (SE)

(72) Inventors: Emad Samadaei, Västra Frölunda (SE); Praveena Pandurangan, Mölndal (SE); John Lord, Olofstorp (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 220 days.

(21) Appl. No.: 18/663,636

(22) Filed: May 14, 2024

(65) Prior Publication Data

US 2024/0396487 A1 Nov. 28, 2024

(30) Foreign Application Priority Data

May 24, 2023 (EP) .................................... 23175035

(51) Int. Cl.
*H02P 29/02* (2016.01)
*H02P 29/024* (2016.01)
*H02P 29/028* (2016.01)

(52) U.S. Cl.
CPC .................................. *H02P 29/027* (2013.01)

(58) Field of Classification Search
CPC ...... H02P 29/028; H02P 29/02; H02P 29/027; H02P 29/0241
USPC .......................................................... 318/434
See application file for complete search history.

(56) References Cited

U.S. PATENT DOCUMENTS 5,825,641 A * 10/1998 Mangtani .................. H02P 6/34 318/400.11
10,230,321 B1 * 3/2019 Papini .................... H02K 21/16
2007/0211396 A1 * 9/2007 Gunji ................... B62D 5/0487 361/31
2016/0142002 A1 * 5/2016 Rummel ................. H02P 29/02 318/434
2016/0248347 A1 * 8/2016 Shinohara ................. H02P 3/18
2018/0131306 A1 * 5/2018 Suzuki ...................... H02P 6/12
2018/0198396 A1 * 7/2018 Hayashi ................ H02P 29/027
2019/0238080 A1 * 8/2019 Della Flora ............. H02P 6/182
2021/0175837 A1 * 6/2021 Wang .................... B60L 3/0046
2023/0094560 A1 * 3/2023 Ji .......................... H02P 29/028 318/504

OTHER PUBLICATIONS

Extended European Search report, European Application No. 23175035.7, mailed Oct. 20, 2023, 10 pages.

* cited by examiner

*Primary Examiner* — Gabriel Agared
(74) *Attorney, Agent, or Firm* — Sage Patent Group

(57) ABSTRACT

An electric motor drive system in a vehicle comprises: a three-leg inverter for driving the electric motor in the vehicle and a fourth leg connected in parallel with the three-leg inverter. The fourth leg comprises a positive temperature coefficient resistor connected in series with a switch. The electric motor drive system further comprises a control unit configured to switch on the switch in the fourth leg for a period of time ts during a regenerative mode of the electric motor such that the PTC resistor is switched in a path of short circuit current flowing through any of the switch transistors in the three-leg inverter to reduce the peak short circuit current generated from the electric motor during the regenerative mode.

8 Claims, 5 Drawing Sheets

ELECTRIC MOTOR DRIVE SYSTEM AND TRANSIENT CURRENT PROTECTION

CROSS REFERENCE TO RELATED APPLICATIONS

This application claims priority to European Patent Application No. 23175035.7, filed on May 24, 2023, the disclosure and content of which is incorporated by reference herein in its entirety.

TECHNICAL FIELD

The disclosure relates generally to electric motor drive (EMD) system. In particular aspects, the disclosure relates to transient current protection in the EMD system.

The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

FIG. 1 is a schematic block diagram showing an example EMD system 100 in a vehicle. The EMD system 100 comprises a three-leg inverter 110 for driving an electric motor or machine 140 in the vehicle. Each leg inverter comprises two switch transistors or diodes Q1/Q2, Q3/Q4, Q5/Q6 connected in series. The EMD system 100 further comprises a capacitor $C_{DC}$ connected in parallel with the three-leg inverter 110. Voltage $V_{DC}$ over the capacitor $C_{DC}$ represents a supply voltage or a traction voltage provided by a supply/traction voltage system to the electric motor 140.

The major issue in the EMD system 100 is transient current which damages the switches or diodes Q1/Q2, Q3/Q4, Q5/Q6 in the EMD system 100. The transient current occurs due to regenerative braking of the electric machine/motor 140 which will flow outwards the traction voltage system. The transient current would cause stress to the switches because it would have higher amplitude. Currently, active short circuit (ASC) is used to solve this issue. However, it will cause stress to the switches because of higher current and thus reduce the reliability of the switches.

The concept of ASC is to employ a brake mode to prevent supply pumping. In brake or coast mode, the motor energy returns to the supply through the switches or diodes Q1/Q2, Q3/Q4, Q5/Q6, which causes the supply voltage $V_{DC}$ to rise as the energy charges the bulk capacitors $C_{DC}$ on the supply. In brake mode, the switches or diodes Q1/Q2, Q3/Q4, Q5/Q6 short the motor 140 and prevent current from flowing into the supply. If a brake mode is asserted instead by turning either the high- or low-side switches or diodes Q1/Q2, Q3/Q4, Q5/Q6 on, the current will recirculate through the switches or diodes Q1/Q2, Q3/Q4, Q5/Q6 rather than returning to the supply.

As shown in FIG. 1, the connection lines for electrical machine 140, which are usually operated with three-phase current, are short-circuited in the electrical machine 140 by insulated-gate bipolar transistors of power electronics. The short circuit current with high amplitude will flow to the traction voltage system via e.g., the switches Q1, Q3 and Q6, which will cause stress to the switches and reduce the reliability of the switches.

SUMMARY

According to a first aspect of the disclosure, an electric motor drive (EMD) system for reducing a peak short circuit current generated from an electric motor during a regenerative mode for a vehicle is disclosed. The EMD system comprises a three-leg inverter for driving the electric motor in the vehicle. Each leg of the three-leg inverter comprises two switch transistors connected in series. The EMD system further comprises a capacitor connected in parallel with the three-leg inverter. The EMD system further comprises a fourth leg connected in parallel with the three-leg inverter. The fourth leg comprises a positive temperature coefficient (PTC) resistor connected in series with a switch. The EMD system further comprises a control unit. The control unit is configured to switch on the switch in the fourth leg for a period of time ts during the regenerative mode of the electric motor such that the PTC resistor is switched in a path of short circuit current flowing through any of the switch transistors in the three-leg inverter.

The first aspect of the disclosure may seek to provide an improved EMD system which can handle the transient current generated from the electric motor during regenerative mode. A technical benefit may include damping the peak short-circuit transient current, reducing the stress on the switches caused by the high transient current and extending reliability and lifetime of the switches in the EMD system.

According to a second aspect of the disclosure, a method performed by a control unit comprised in an electric motor drive (EMD) system for a vehicle for reducing a peak short-circuit current generated from an electric motor during a regenerative mode is disclosed. The EMD system comprises a three-leg inverter for driving the electric motor in the vehicle. Each leg of the three-leg inverter comprises two switch transistors connected in series. The EMD system further comprises a capacitor connected in parallel with the three-leg inverter. The EMD system further comprises a fourth leg connected in parallel with the three-leg inverter. The fourth leg comprises a positive temperature coefficient (PTC) resistor connected in series with a switch (T1). The method comprises determining whether the electric motor is in a regenerative mode; switching on the switch in the fourth leg for a period of time ts when it is determined that the electric motor is in a regenerative mode; and switching off the switch in the fourth leg when it is determined that the short circuit current reaches a predetermined current level.

The second aspect of the disclosure may seek to provide a method for handling the transient current generated from the electric motor during regenerative mode. A technical benefit may include damping the peak short-circuit transient current, reducing the stress on the switches caused by the high transient current and extending reliability and lifetime of the switches in the EMD system.

Optionally in some examples, including in at least one example, determining whether the electric motor is in a regenerative mode may be performed by determining whether a traction voltage to the electric motor is zero or under a predetermined voltage level.

Optionally in some examples, including in at least one example, determining whether the electric motor is in a regenerative mode may be performed by determining whether a back electromotive force (EMF) voltage is higher than a traction voltage to the electric motor.

According to a fourth aspect of the disclosure, a vehicle comprises an electric motor drive (EMD) system as described above is disclosed.

According to a fifth aspect of the disclosure, a vehicle comprises a control unit to perform the method for reducing a peak short circuit current generated from an electric motor during a regenerative mode as described above is disclosed.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

As discussed in the background, the major issue in an EMD system is transient current which damages the switches or diodes Q1/Q2, Q3/Q4, Q5/Q6 in the EMD system. The transient current occurs due to regenerative braking of electric machine 140 which will flow outwards the traction voltage system via the switches or diodes Q1/Q2, Q3/Q4, Q5/Q6. To damp the transient current, it is proposed to implement an additional leg to the existing three-leg inverter 110. This additional leg can reduce the amplitude of the transient current so that it will not be a problem for the power module switches Q1/Q2, Q3/Q4, Q5/Q6 anymore. The additional leg comprises at least one switched, positive temperature coefficient (PTC) resistor. The PTC resistor is an electronic component with a positive temperature coefficient. Current flows particularly well through the PTC resistor when its temperature is low, e.g., lower than its transition temperature at which the resistance of the PTC resistor starts to rise rapidly. If the ambient temperature rises, the resistance rises and less current flows through the PTC resistor. This character of the PTC resistor is used to damp the transient current since when the transient current is generated during regenerative braking of electric machine 140, the ambient temperature is high, the resistance of the PTC resistor rises and reduces the current flows through the PTC resistor.

Figure 1:
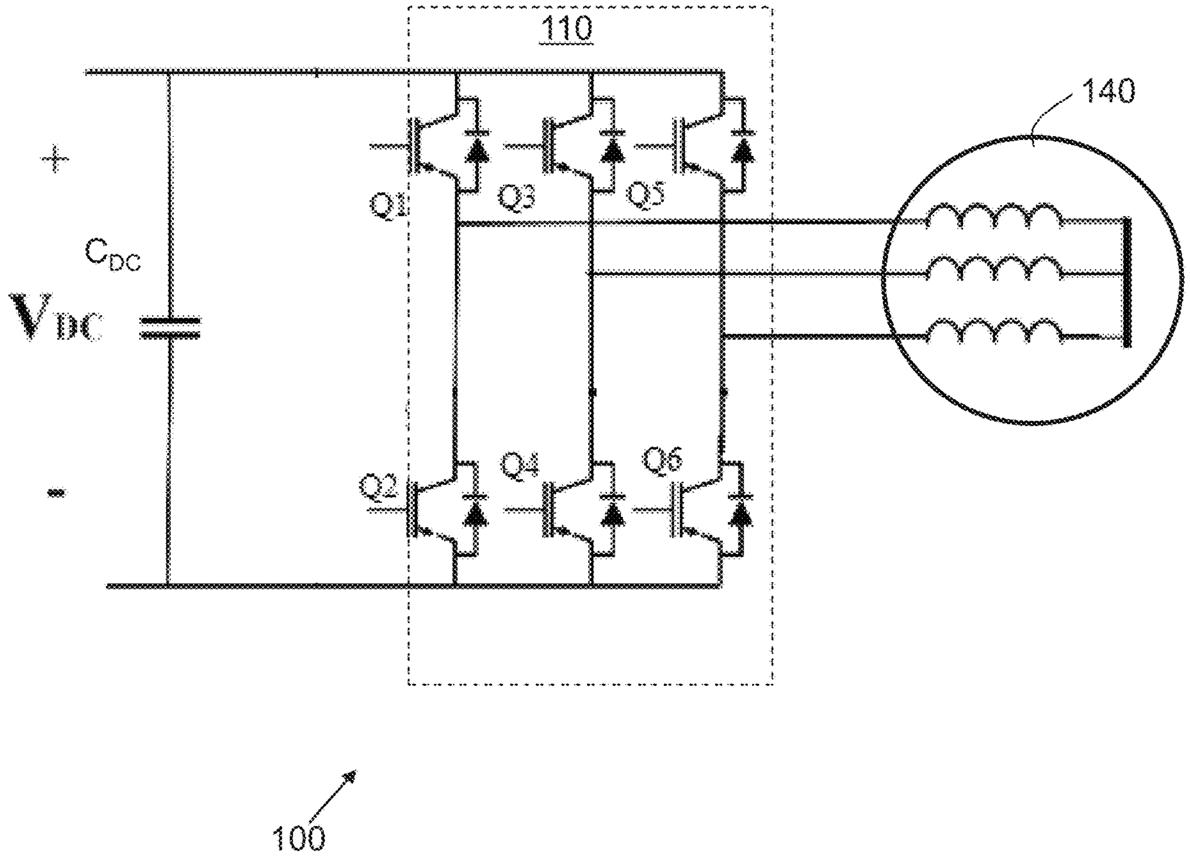
FIG. 1 is a schematic block diagram showing an exemplary EMD system according to an example.
Figure 2:
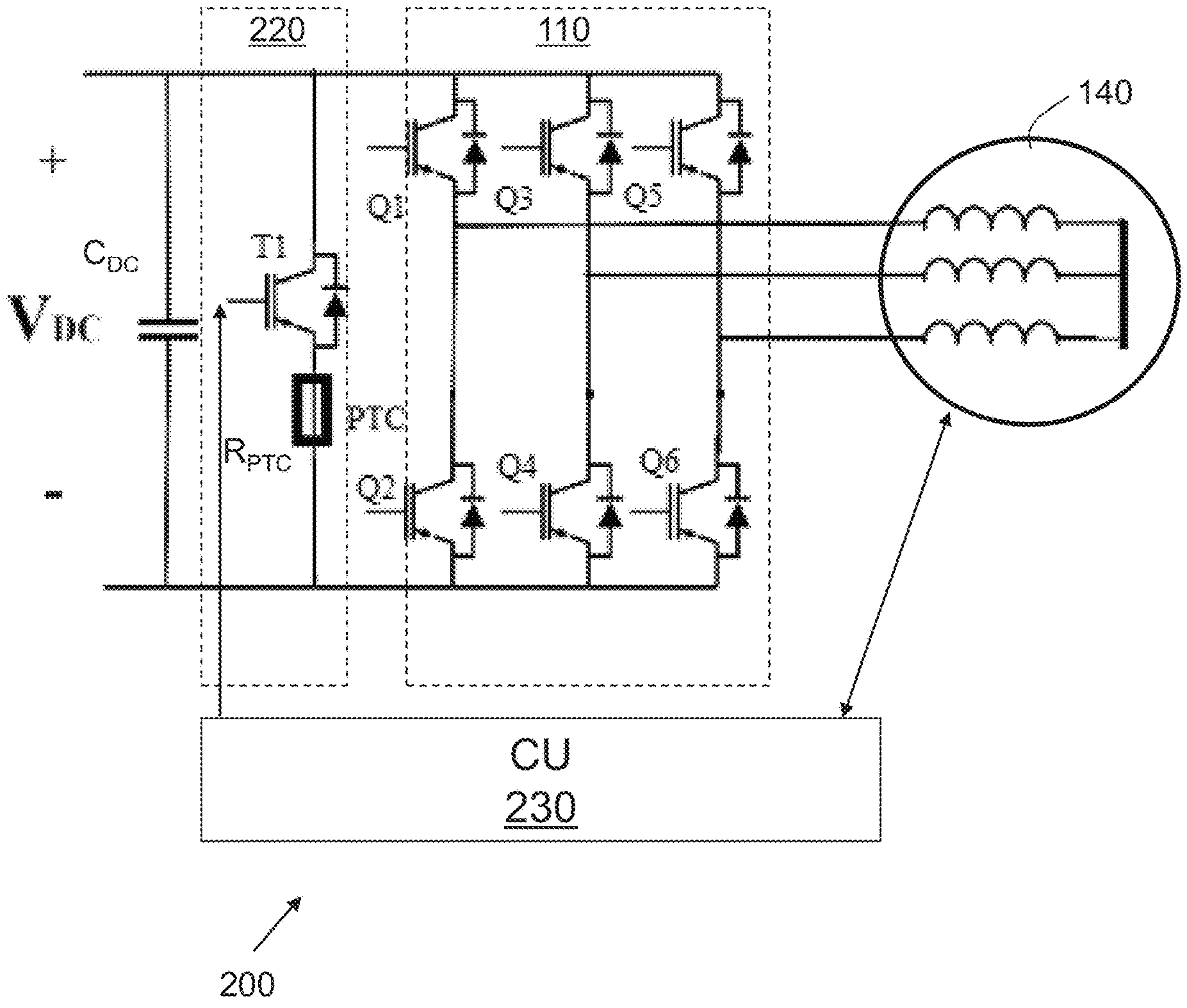
FIG. 2 is a schematic block diagram showing an exemplary EMD system according to an example.

FIG. 2 is a schematic block diagram showing an exemplary EMD system 200 according to an example for reducing a peak short circuit current generated from an electric motor 140 during a regenerative mode in a vehicle.

The EMD system 200 comprises a three-leg inverter 110 for driving the electric motor 140 in the vehicle. Each leg inverter comprises two switch transistors or diodes Q1/Q2, Q3/Q4, Q5/Q6 connected in series.

The EMD system 200 further comprises a capacitor $C_{DC}$ connected in parallel with the three-leg inverter 110.

The EMD system 200 further comprises a fourth leg 220 connected in parallel with the three-leg inverter 110. The fourth leg 220 comprises a PTC resistor $R_{PTC}$ connected in series with a switch T1. The switch T1 is used to switch in the fourth leg 220 in a path for the short circuit current.

The EMD system 200 further comprises a control unit (CU) 230. The control unit 230 is configured to switch on the switch T1 in the fourth leg 220 for a period of time ts during the regenerative mode of the electric motor 140 such that the PTC resistor RPC is switched in a path of short circuit current flowing through any of the switch transistors Q1/Q2, Q3/Q4, Q5/Q6 in the three-leg inverter 110 to reduce the peak short circuit current generated from the electric motor 140 during the regenerative mode.

For example, when the electric motor 140 enters the regenerative mode, depending on the phases of the three-phase current to the electric motor 140, the switches Q1, Q3 and Q6 may be switched on or closed. They conduct the current which comes from the electric motor 140, and the switch T1 will be closed to put the PTC resistor $R_{PTC}$ in a path of current flow, i.e., a current flow path Q1, Q3→motor 140→Q6→$R_{PTC}$→T1→Q1, Q3. When a short circuit occurs in the EMD system 200, which usually is a transient of a few seconds ts, the ambient temperature is high, so the resistance of the PTC resistor is high, switching in the PTC resistor $R_{PTC}$ in the current flow path will decrease the peak of regenerative current in a range of tolerable level of the switch T1.

Figure 3:
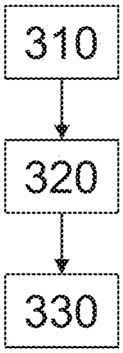
FIG. 3 is a flow chart showing a method performed in a control unit according to an example.

A method performed by a control unit CU 230 comprised in the EMD system 200 in a vehicle for reducing a peak short circuit current generated from an electric motor 140 during a regenerative mode will be described with reference to FIG. 3. The method comprises at least one of the following actions, which actions may be performed in any suitable order than described herein.

Action 310

The control unit CU 230 determines whether the electric motor 140 is in a regenerative mode.

The control unit CU 230 may be a control unit in an energy management system of the vehicle used to control the electric machine/motor 140 based on requisition from torque i.e., from vehicle via electric motor drive, help utilize the available energy resources etc. The control unit CU 230 may receive various sensory inputs, internal system and driver commands to calculate the required power demand, determine whether the electric motor 140 is in a regenerative mode, etc. Upon which appropriate control signals are generated to e.g., initiate for smooth energy transfer from the battery to wheels and vice-versa, control switch T1 etc.

Electrical motors are reversible machines. They can function as motors or as generators. A motor receives electrical power from a battery and transforms it in torque developing a Counter Electromotive Force CEMF, which opposes the battery. A generator receives mechanical power from a mechanical actuator and transforms it in electrical power developing a Counter Torque, which opposes the actuator.

In certain situations the CEMF may overcome the battery, in which case the generator component becomes dominant; the motor acts as a generator inverting the direction of its current and forcing it into the battery.

The typical situation is the one of a heavy vehicle rolling on a sharp downhill slope and forcing the motor to turn fast enough that the CEMF becomes larger than the battery voltage. As soon as the motor overcomes the battery it inverts the current direction and starts feeding current into the battery, while developing a counter torque that acts as a brake. This phase is called regeneration i.e., recharging of the battery, and the motor is in the regenerative mode.

According to an example, determining whether the electric motor 140 is in a regenerative mode may be performed by determining whether a traction voltage to the electric motor 140 is zero or under a predetermined voltage level, e.g., 450V. For example, if the traction voltage is lower than 450 V, the electric motor 140 is in regenerative mode.

According to an example, determining whether the electric motor 140 is in a regenerative mode may be performed by determining whether a back or counter EMF voltage is higher than a traction voltage to the electric motor 140. The back EMF voltage is directly related to the speed of a motor 140, which may be e.g., 666 V. For example, if the back EMF voltage is higher than the traction voltage of 450 V, the electric motor 140 is in regenerative mode.

Action 320

The control unit CU 230 may generate a first signal to switch on the switch T1 in the fourth leg 220 for a period of ts when it is determined that the electric motor 140 is in a regenerative mode. The period ts may be a few milliseconds.

Action 330

The control unit CU 230 may generate a second signal to switch off the switch T1 in the fourth leg 220 when it is determined that the short circuit current reaches a predetermined current level, e.g., a normal current level of 600 A.

Figure 4:
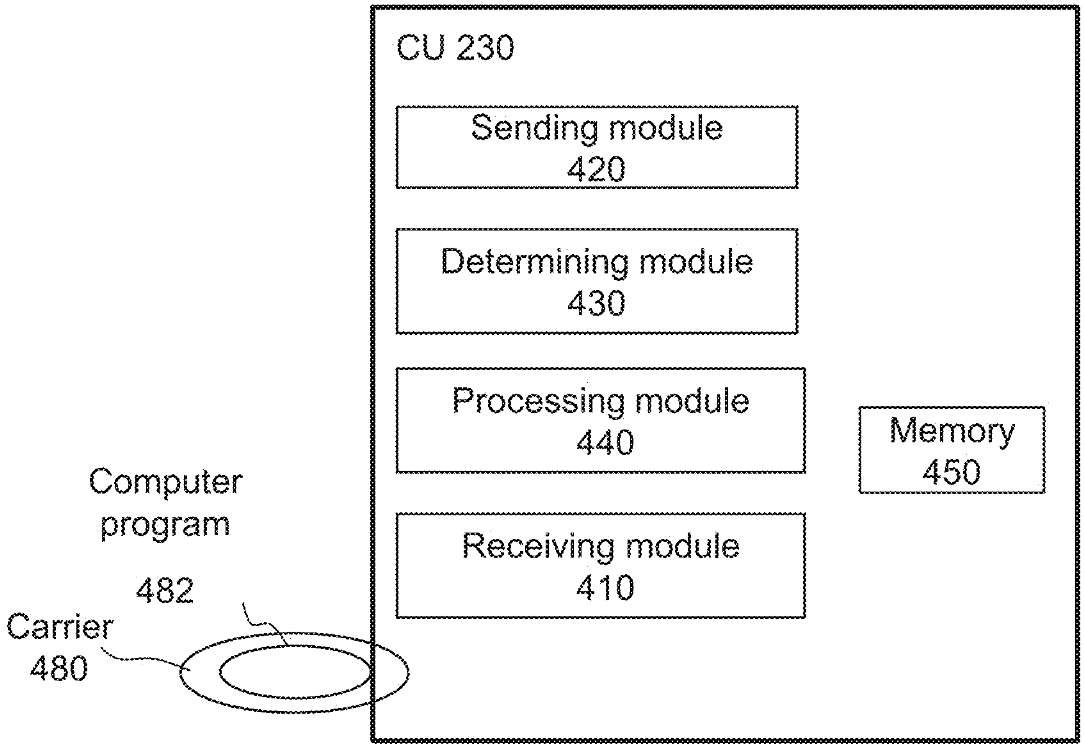
FIG. 4 is a schematic block diagram showing a vehicle according to an example.

To perform the method for reducing a peak short circuit current generated from an electric motor 140 during a regenerative mode, the control unit CU 230 may comprise modules or units as shown in FIG. 4. The control unit CU 230 may comprise a receiving module 410, a sending module 420, a determining module 430, a processing module 440 etc. The control unit CU 230 may comprise other units or modules, e.g., a memory 450.

The control unit CU 230 is configured to, by means of e.g., the determining module 430 being configured to, determine whether the electric motor 140 is in a regenerative mode.

The control unit CU 230 is configured to, by means of e.g., the processing module 440 being configured to generate a first signal, switch on the switch T1 in the fourth leg 220 for a period of ts when it is determined that the electric motor 140 is in a regenerative mode.

The control unit CU 230 is configured to, by means of e.g., the processing module 440 being configured to generate a second signal, switch off the switch T1 in the fourth leg 220 when it is determined that the short circuit current reaches a predetermined current level, e.g., a normal current level of 600 A.

Those skilled in the art will appreciate that the receiving module 410, the sending module 420, the determining module 430 and the processing module 440 described above may be referred to one circuit or unit, a combination of analog and digital circuits, one or more processors, configured with software and/or firmware and/or any other digital hardware performing the function of each circuit/unit. One or more of these processors, the combination of analog and digital circuits as well as the other digital hardware, may be included in a single application-specific integrated circuitry (ASIC), or several processors and various analog/digital hardware may be distributed among several separate components, whether individually packaged or assembled into a system-on-a-chip.

The method according to embodiments herein may be implemented through one or more processors together with computer program code for performing the functions and actions of the embodiments herein. The program code mentioned above may also be provided as a computer program product, for instance in the form of a data carrier 480 carrying computer program code 482, as shown in FIG. 4, for performing the embodiments herein when being loaded into the control unit CU 230. One such carrier is shown as the form of a CD ROM disc. It is however feasible with other data carriers such as a memory stick, a non-transitory computer-readable storage medium etc. The computer program code may furthermore be provided as pure program code on a server or cloud and downloaded to the control unit CU 230.

The memory 450 in the control unit CU 230 may comprise one or more memory units and may be arranged to be used to store received information, measurements, data, configurations and applications to perform the method herein when being executed in the control unit CU 230.

Figure 5:
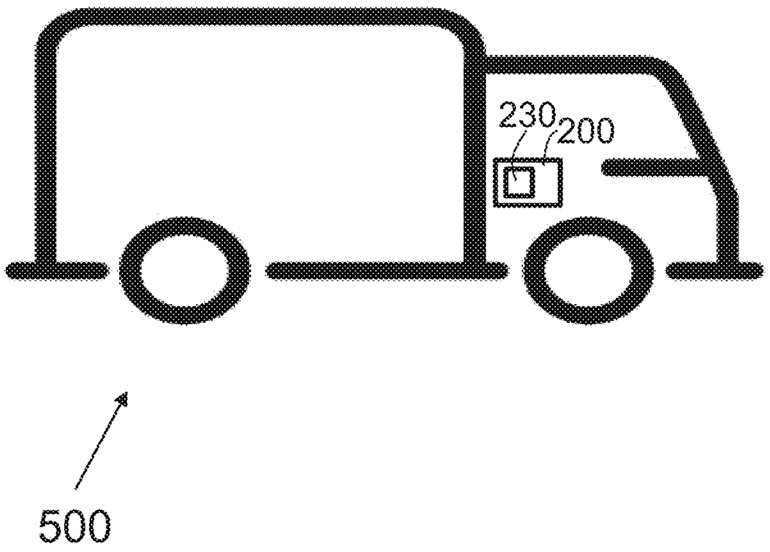
FIG. 5 is a schematic block diagram showing a control unit in an EMD system according to an example.

FIG. 5 is a schematic diagram showing a vehicle 500 in which the disclosure may be implemented. The vehicle 500 comprises the EMD system 200 as described above. The EMD system 200 may comprise a processor device, e.g., the control unit CU 230, to perform the method for reducing a peak short circuit current generated from an electric motor 140 during a regenerative mode as described above.

The disclosure can be applied in any type of vehicles such as wagons, motor vehicles e.g., motorcycles, cars, trucks, buses, railed vehicles e.g., trains, trams, watercraft e.g., ships, boats, amphibious vehicles e.g., screw-propelled vehicle, hovercraft, aircraft e.g., airplanes, helicopters, acrostat and spacecraft etc.

Figure 6:
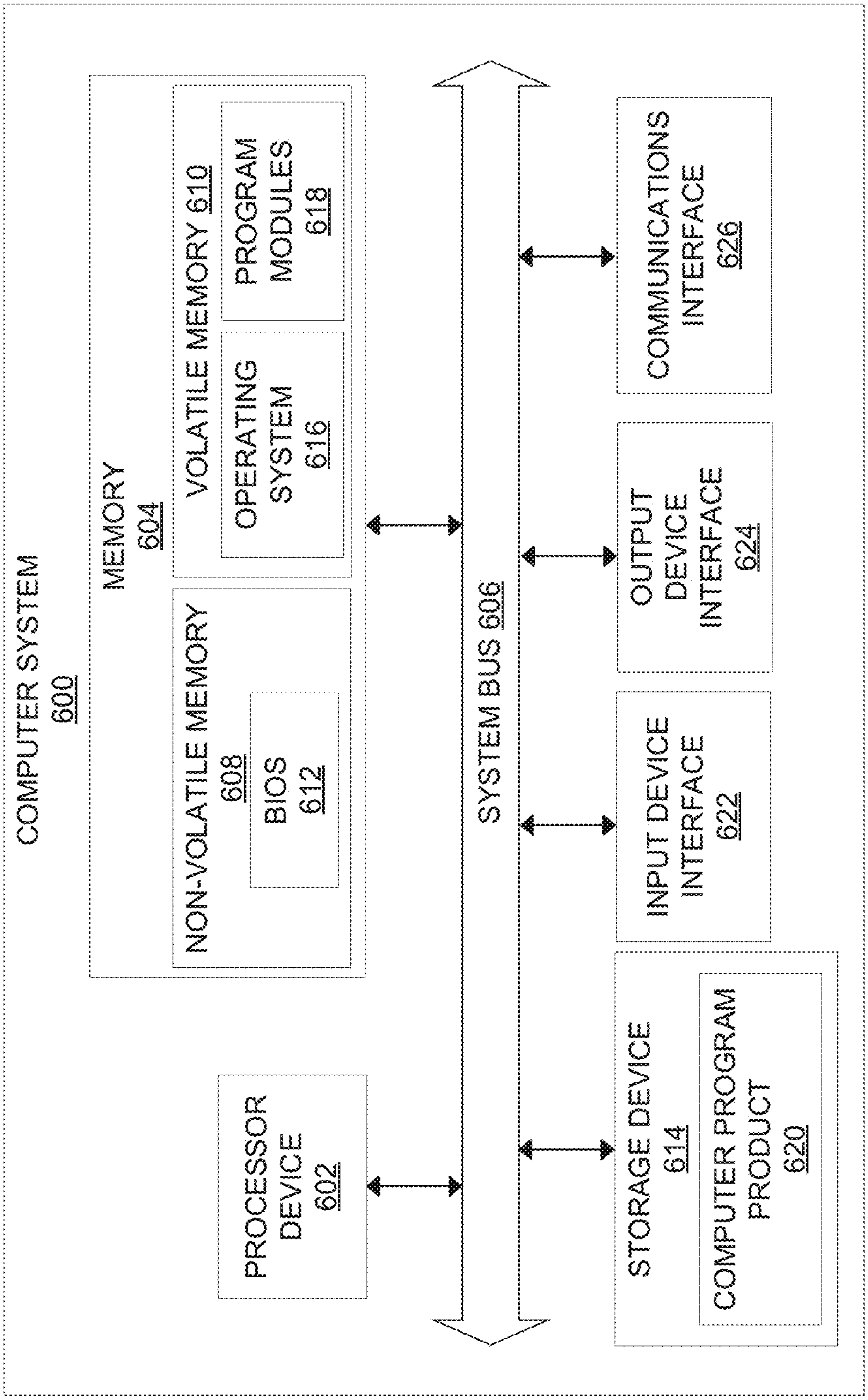
FIG. 6 is a schematic diagram of an exemplary computer system for implementing examples disclosed herein, according to an example.

FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include processing circuitry 602 (e.g., processing circuitry including one or more processor devices or control units), a memory 604, and a system bus 606. The computer system 600 may include at least one computing device having the processing circuitry 602. The system bus 606 provides an interface for system components including, but not limited to, the memory 604 and the processing circuitry 602. The processing circuitry 602 may include any number of hardware components for conducting data or signal processing or for executing computer code stored in memory 604. The processing circuitry 602 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 602 may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processing circuitry 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with processing circuitry 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program 620 stored on a transitory or non-transitory computer-usable or computer-readable storage medium (e.g., single medium or multiple media), such as the storage device 614, which includes complex programming instructions (e.g., complex computer-readable program code) to cause the processing circuitry 602 to carry out actions described herein. Thus, the computer-readable program code of the computer program 620 can comprise software instructions for implementing the functionality of the examples described herein when executed by the processing circuitry 602. In some examples, the storage device 614 may be a computer program product (e.g., readable storage medium) storing the computer program 620 thereon, where at least a portion of a computer program 620 may be loadable (e.g., into a processor) for implementing the functionality of the examples described herein when executed by the processing circuitry 602. The processing circuitry 602 may serve as a controller or control system for the computer system 600 that is to implement the functionality described herein.

The computer system 600 may include an input device interface 622 configured to receive input and selections to be communicated to the computer system 600 when executing instructions, such as from a keyboard, mouse, touch-sensitive surface, etc. Such input devices may be connected to the processing circuitry 602 through the input device interface 622 coupled to the system bus 606 but can be connected through other interfaces, such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may include a communications interface 626 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Various examples are listed in the following.

Example 1: An electric motor drive (EMD) system 200 for a vehicle 500, wherein the EMD system 200 comprises:

a three-leg inverter 110 for driving the electric motor 140) in the vehicle, wherein each leg of the three-leg inverter 110 comprises two switch transistors Q1/Q2, Q3/Q4, Q5/Q6 connected in series;

a capacitor $C_{DC}$ connected in parallel with the three-leg inverter 110;

a fourth leg 220 connected in parallel with the three-leg inverter 110, wherein the fourth leg comprises a positive temperature coefficient (PTC) resistor $R_{PTC}$ connected in series with a switch T1; and a control unit 230; wherein the control unit 230 is configured to switch on the switch T1 in the fourth leg 220 for a period of time ts during the regenerative mode of the electric motor such that the PTC resistor $R_{PTC}$ is switched in a path of short circuit current flowing through any of the switch transistors Q1/Q2, Q3/Q4, Q5/Q6 in the three-leg inverter 110 to reduce the peak short circuit current generated from the electric motor during the regenerative mode.

Example 2: A method performed by a control unit CU 230 comprised in an electric motor drive (EMD) system 200 for a vehicle (500) for reducing a peak short circuit current generated from an electric motor (140) during a regenerative mode, wherein the EMD system 100 comprises: a three-leg inverter 110 for driving the electric motor 140 in the vehicle 500, wherein each leg of the three-leg inverter 110 comprises two switch transistors Q1/Q2, Q3/Q4, Q5/Q6 connected in series; a capacitor $C_{DC}$ connected in parallel with the three-leg inverter 110; a fourth leg 220 connected in parallel with the three-leg inverter 110, wherein the fourth leg 220 comprises a positive temperature coefficient resistor $R_{PTC}$ connected in series with a switch T1; the method comprising:

- determining (310) whether the electric motor is in a regenerative mode;
- switching on (320) the switch T1 in the fourth leg 220 for a period of time ts when it is determined that the electric motor is in a regenerative mode; and
- switching off (330) the switch T1 in the fourth leg 220 when it is determined that the short circuit current reaches a predetermined current level.

Example 3: The method of Example 2, wherein determining (310) whether the electric motor is in a regenerative mode is performed by determining whether a traction voltage to the electric motor is zero or under a predetermined voltage level.

Example 4: The method of Example 2, wherein determining (310) whether the electric motor is in a regenerative mode is performed by determining whether a back electromotive force (EMF) voltage is higher than a traction voltage to the electric motor.

Example 5: A vehicle 500 comprising an electric motor drive (EMD) system (200) according to Example 1.

Example 6: A vehicle (500) comprising a control unit 230 configured to perform the method of any of Examples 2-4.

Example 7: A computer program product comprising program code for performing, when executed by a processor circuitry 602 in a vehicle 500, the method of any of Examples 2-4.

Example 8: A non-transitory computer-readable storage medium 614 comprising instructions, which when executed by a processor circuitry 602 in a vehicle, cause the processor circuitry 602 to perform the method of any of Examples 2-4.

Example 9: A computer system 600 comprising processing circuitry 602 configured to perform the method of any of Examples 2-4.

Example 10: A vehicle 500 comprising the computer system 600 of Example 9.

Example 11: A computer-implemented method for reducing a peak short circuit current generated from an electric motor during a regenerative mode in a vehicle, wherein the vehicle comprises an electric motor drive (EMD) system (200) comprising a three-leg inverter (110) and a fourth leg (220) connected in parallel with the three-leg inverter (110), wherein the fourth leg (220) comprises a positive temperature coefficient (PTC) resistor ($R_{PTC}$) connected in series with a switch T1, the method comprising:

- determining (310), by processing circuitry 602 of a computer system 600, whether an electric motor in a vehicle is in a regenerative mode;
- switching on (320), by output device interface 624 of a computer system 600, the switch T1 in the fourth leg 220 for a period of time ts when it is determined that the electric motor is in a regenerative mode; and
- switching off (330), by output device interface 624 of a computer system 600, the switch T1 in the fourth leg 220 when it is determined that the short circuit current reaches a predetermined current level.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. An electric motor drive (EMD) system for a vehicle, wherein the EMD system comprises:

- a three-leg inverter for driving an electric motor of the vehicle, wherein each leg of the three-leg inverter comprises two switch transistors connected in series;
- a capacitor connected in parallel with the three-leg inverter;

a fourth leg connected in parallel with the three-leg inverter, wherein the fourth leg comprises a positive temperature coefficient (PTC) resistor connected in series with a switch; and a control unit; wherein, the control unit is configured to switch on the switch in the fourth leg for a period of time (ts) during a regenerative mode of the electric motor such that the PTC resistor is switched in a path of short circuit current flowing through any of the switch transistors in the three-leg inverter to reduce the peak short circuit current generated from the electric motor during the regenerative mode.

2. A method performed by a control unit (CU) comprised in an electric motor drive (EMD) system for a vehicle for reducing a peak short circuit current generated from an electric motor during a regenerative mode, wherein the EMD system comprises:

a three-leg inverter for driving the electric motor in the vehicle, wherein each leg of the three-leg inverter comprises two switch transistors connected in series;

a capacitor connected in parallel with the three-leg inverter;

a fourth leg connected in parallel with the three-leg inverter, wherein the fourth leg comprises a positive temperature coefficient (PTC) resistor connected in series with a switch;

the method comprising:

determining whether the electric motor is in the regenerative mode;

switching on the switch in the fourth leg for a period of time (ts) when it is determined that the electric motor is in the regenerative mode; and switching off the switch in the fourth leg when it is determined that the short circuit current reaches a predetermined current level.

3. The method of claim 2, wherein determining whether the electric motor is in the regenerative mode is performed by determining whether a traction voltage to the electric motor is zero or under a predetermined voltage level.

4. The method of claim 2, wherein determining whether the electric motor is in the regenerative mode is performed by determining whether a back electromotive force (EMF) voltage is higher than a traction voltage to the electric motor.

5. A computer program product comprising program code for performing, when executed by a processor circuitry in the vehicle, the method of claim 2.

6. A non-transitory computer-readable storage medium comprising instructions, which when executed by a processor circuitry in the vehicle, cause the processor circuitry to perform the method of claim 2.

7. A computer system comprising processing circuitry configured to perform the method of claim 2.

8. A computer-implemented method for reducing a peak short circuit current generated from an electric motor during a regenerative mode in a vehicle, wherein the vehicle comprises an electric motor drive (EMD), system comprising a three-leg inverter and a fourth leg connected in parallel with the three-leg inverter, wherein the fourth leg comprises a positive temperature coefficient (PTC) resistor connected in series with a switch, the method comprising:

determining, by processing circuitry of a computer system, whether an electric motor in a vehicle is in the regenerative mode;

switching on, by output device interface of a computer system, the switch in the fourth leg for a period of time (ts) when it is determined that the electric motor is in a regenerative mode; and switching off, by output device interface of a computer system, the switch in the fourth leg when it is determined that the short circuit current reaches a predetermined current level.

* * * * *